March 9, 1937.   F. E. WOLCOTT   2,072,935
COFFEE MAKING DEVICE
Filed Sept. 30, 1935
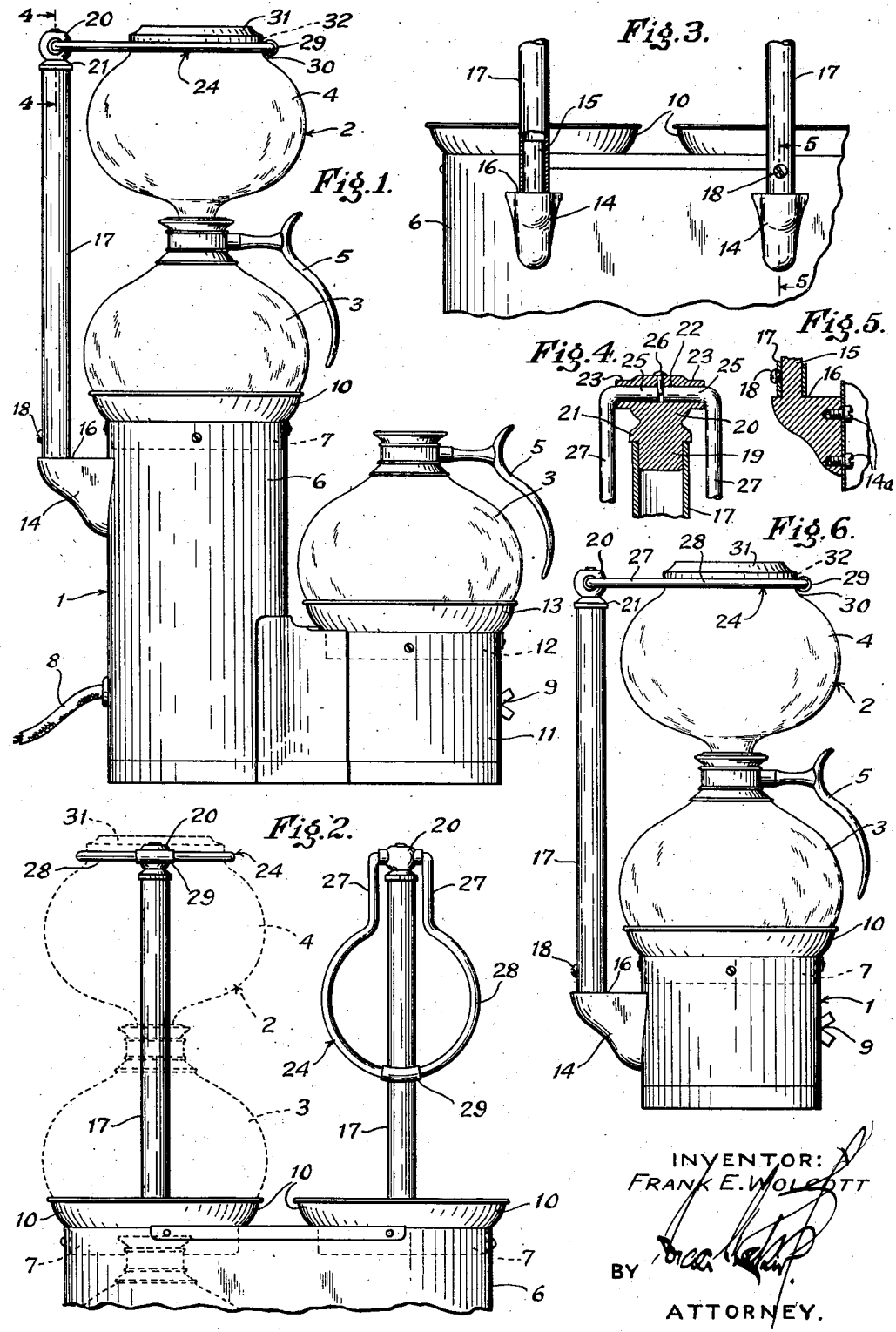
INVENTOR:
FRANK E. WOLCOTT
BY
ATTORNEY.

Patented Mar. 9, 1937

2,072,935

UNITED STATES PATENT OFFICE 2,072,935

COFFEE MAKING DEVICE

Frank E. Wolcott, West Hartford, Conn., assignor, by mesne assignments, to The Silex Company, a corporation of Connecticut (1936)

Application September 30, 1935, Serial No. 42,799

23 Claims. (Cl. 53—3)

My invention relates to coffee making devices.

It has among its objects to provide an improved coffee making device including a vacuum type coffee maker comprising interconnected upper and lower bowls, and, more particularly, to provide such a device especially adapted to use on moving vehicles, such, for example, as ships, trains or the like, wherein due to irregularities in vehicle movement, such, as rocking or swaying, and to the top heavy character of such coffee makers during brewing, considerable difficulty has heretofore been experienced in using coffee makers of the vacuum type. A further object of my invention is to provide improved means associated with such a vacuum type coffee maker and also with the heating device for the lower bowl thereof, whereby, despite irregularities in the movement of the vehicle and consequently of the heating device and the coffee maker heated thereby, the latter is maintained in the desired relation to the heating device in such manner as, while enabling normal handling of the bowls, to eliminate the breakage and delays heretofore experienced and resulting, for example, from the relatively high coffee maker being thrown from its heating device when the vehicle rocks or sways. A still further object of my invention is to provide improved holding means adapted to be very readily and quickly applied to upper bowl of a coffee maker when on the heating device and also to be readily and quickly moved relative to the coffee maker in order to permit removal of the upper bowl therefrom or the bodily removal of the complete coffee maker from the heating device whenever desired. Further objects of my invention are to provide an improved coffee maker device having such means of an improved construction adapted to cooperate in a new manner with the upper bowl of such a vacuum coffee maker and disposed and arranged relative thereto and carried on the heating device in an improved manner, while also cooperating with other lower bowl positioning means in an improved manner. These and other objects and advantages of my improved construction will, however, hereinafter more fully appear.

In the accompanying drawing I have shown for purposes of illustration two embodiments which my invention may assume in practice.

In this drawing,—

Figure 1 is an end elevation of one form of my improved coffee making device;

Fig. 2 is a front view of the upper portion of this device, a coffee maker being indicated in dotted lines at the left thereof in the same position shown in Figure 1, the left-hand holding means being shown in operative position and the right-hand positioning means being shown in a depending or inoperative position;

Fig. 3 is a detail rear view showing the connection of the positioning means to the heating device;

Fig. 4 is an enlarged detail sectional view on line 4—4 of Figure 1, showing the pivotal mounting for the swinging upper bowl holding bail or member;

Fig. 5 is a detail sectional view on line 5—5 of Figure 3, and

Fig. 6 is a view similar to Figure 1, showing a modified construction.

Referring first to Figure 1, it will be noted that I have shown therein a heating device, generally indicated at 1, carrying in brewing position thereon a vacuum type coffee maker, generally indicated at 2, comprising a lower bowl 3 and an upper bowl 4 connected by a usual stem and seal and having a handle 5 disposed around the neck of the bowl 3, while improved means, hereinafter described, are provided on the heating device 1 and cooperate with the coffee maker 2 to hold the same in the desired position on the heating device, despite rocking or swaying thereof.

In this illustrative construction, it will be noted that the heating device 1 comprises a relatively high heater carrying portion 6 carrying suitable heating means, such for example, as a heating means, generally indicated at 7, and adapted to heat the lower bowl 3 of the coffee maker 2 seated on the top of the member 6. While other types of heating means may be used, such for example as a gas heater, I have herein illustrated the same as of the electrically heated type adapted to be supplied with current from conductors 8 and controlled by a switch 9. Further, it will be noted that the portion 6 is provided with an upstanding flange or rim 10 adapted to receive and position against relative lateral movement the generally similarly shaped, but smaller, bottom portion of the lower bowl 3. Moreover, it will be noted that herein the heating device 1 is provided with a portion 11, generally corresponding to the portion 6 but lower than the latter and likewise carrying a heating element 12 and having a flange or rim 13 corresponding to the flange or rim 10 heretofore described. Thus, it will be noted that, with the heating element 7 adapted to produce a high heat suitable for the coffee brewing operation and the heating element 12 adapted to produce a substantially lower heat, it is possible to make the coffee over the heating element 7, and, after the completion of the coffee making operation, remove the upper bowl 4 from the bowl 3 and thereafter keep the coffee in the lower or dispensing bowl 3 at the desired temperature by placing the latter bowl upon the heating element 12, which forms a warming element. Further it will be noted that herein the construction is such that a plurality of heating elements 7 and flanges 10 are provided on and spaced along the top of the portion 6, and it will be understood that a corresponding number of warming elements 12 and flanges 13 are provided on the lower portion 11.

Operatively associated with the portion 6 of the heating device 1 and cooperating with the upper bowls 4 of the coffee makers 2 thereon during the coffee brewing operations, are improved positioning means for the coffee maker. Herein, each of these means includes a projection or bracket 14 projecting rearwardly from the portion 6 adjacent the top thereof and in rear of each flange 10 below the latter. These brackets may be attached to the portion 6 in any suitable manner and herein are attached thereto by screws 14a securely fixing the bracket 14, herein in the form of a casting, to the back of the portion 6. Further, it will be noted that each of the brackets 14 is herein provided with a short upward extension 15 of reduced cross section thereon, and that a shoulder portion 16 is provided on each bracket around the base of its projection 15. Moreover, a tubular member or rod 17 is herein seated on this shoulder portion 16, with the projection 15 extending up into this tubular member, while the latter is also suitably fixed to the extension 15 as by a screw 18. This member 17 herein extends upward above bracket 14 to a point adjacent the top of the upper bowl 4 and herein is also tubular throughout its length and receives within its upper end a reduced portion 19 on a swivel carrying member 20.

This swivel carrying member 20 carries improved means cooperating with the upper bowl 4 in positioning the coffee maker 2. Herein, this member 20 is fixed to the upper end of the member 17 in any suitable manner, as for example, by providing a driving fit between the same and the member 17, while a shouldered portion 21 is provided on the member 20 and adapted to rest on the upper end of the tubular member 17. As shown, the member 20 is also transversely bored as shown at 22, and herein also provided with lateral extensions 23 and an improved bail or holding member, generally indicated at 24, is pivotally mounted in the bore 22 for swinging movement in upright planes. As shown, this bail 24 comprises a single solid rod or bail member, having laterally extending end portions 25 extending into the opposite ends of the bore 22 and the bail is of such spring construction and conformation as normally to cause these portions 25 to assume the position indicated in Figure 4, with the extremities thereof adjacent and on the opposite sides of a pin 26, extending downward through the top of the member 20 into the bore 22. Moreover, it will be noted that herein these transverse portions 25 on the bail are carried on parallel portions 27 extending longitudinally of the bail 24, and that the bail body proper 28, is substantially circular in form and connects the front ends of these portions 27. It will also be noted that a short bowl engaging and gripping cushion 29, herein a short tubular section of rubber or the like, is carried centrally on the front of the bail body 28 and acts as a connection and holding means adapted to engage the top of the bowl 4 from above, herein on a curved surface 30 just below the removable top 31 carried on that bowl, while the body portion 28 of the bail surrounds the reduced upper end 32 of the bowl on which the top or cover 31 is carried.

As a result of this construction, it is made possible for the bail, when not in use, to occupy the depending position shown at the right in Figure 2. Further, whenever it is desired to place a coffee maker 2 on a heating element 7, it is possible to swing up the bail 28 and, after the coffee maker has been placed on the stove device with its lower bowl within the desired rim or flange 10 thereon, lower the bail into the position shown in Figure 1, wherein the portion 28 surrounds the reduced upper end 32 of the upper bowl 4 and the cushion grip 29 on the bail body 28 engages the curved portion 30 of the bowl 4. Thus, with the weight of the bail pressing the gripping member 29 against the glass of the bowl 4, while the bottom of the bowl 3 is disposed within the upstanding flange 10 on the stove, the entire coffee maker 2 is held securely in its desired relation with respect to the stove irrespective of any swaying or rocking movements in any direction of the vehicle and stove, and irrespective of the relatively high vacuum type coffee maker on the top of the relatively high stove carrying portion 6 or the weight of the water and coffee in the top bowl 4 during brewing. Moreover, it will be evident that when the coffee making operation has been completed, i. e. when the brewed coffee in the upper bowl 4 has been returned therefrom to the lower or dispensing bowl 3, the upper bowl with the coffee grounds therein may be removed in the usual manner after simply raising or throwing back the bail 24. Note here also that the bail 24 may be swung completely over backward until its cushion 29 engages the back of the upright 17. Then, with the upper bowl 4 removed, the lower or dispensing bowl 3 may, if desired, be used to dispense the brewed coffee or placed on one of the warming elements 12 within the flange 13 above the latter and kept hot ready for dispensing, while the coffee making operation is repeated in another coffee maker on the vacated heating element 7.

In Figure 6, I have illustrated a modified form of my construction which may be used in connection with a stove device 1, corresponding in general to the lower or warming portion of the stove 1 heretofore described. It will be understood, however, that the same includes one or more heating elements side by side, and that one or more of the same may correspond to the coffee making heating element 7 with the remainder corresponding to the warming element 12. In this construction, it will be noted that my improved positioning means are of the same construction heretofore described and the same are usable in the same manner, so that a further description thereof in this connection is believed to be unnecessary.

With my improved construction, it is made possible even under the most adverse conditions, to eliminate altogether the breakage and delays incident to the throwing or "shucking off" of the coffee makers, heretofore incident to efforts to use such vacuum coffee makers on trains, ships, or the like, these coffee makers being especially susceptible to such damage during brewing or infusion when a substantial part, or all, of the water is in the upper bowl while the lower bowl is partially or completely emptied. Moreover, it will be noted that the construtcion is such as to permit the coffee maker to be very readily and securely held in operative position on the stove or heating element, the bail being readily swung into or out of holding position. When the bail is in holding position, it will also be noted that, due to the mounting thereof for vertical swinging movement, the weight of the bail, which preferably is made of a solid spring rod bent into the shape illustrated, is such as to make the bail normally tend to remain in close contact with the curved upper surface of the bowl with the rubber or cushioning means pressed into gripping engagement with the glass. Thus all difficulty with chattering in holding position is eliminated, while breakage due to careless dropping of the bail on the top of the bowl 4 is also minimized by the member 29. Further, it will be evident that the rubber or cushioning means 29 also acts to minimize noise or chattering when the ball is in its inoperative depending position, while the rubber 29, also acting as a heat insulating means for the bail, keeps the latter from becoming too hot to handle. Attention is further directed to the fact that my improved construction is such as to enable the assembled coffee maker to be placed bodily upon the stove and within the selected rim or flange 10, and then be secured in position simply by swinging the holding member 24 into holding position, all necessity for either disassembling the coffee maker or making different connections to the different bowls thereof being eliminated. When it is desired to remove the upper bowl, it will also be noted that the same is removable after a mere swinging movement of the member 24, and that a like swinging movement of this single member also releases the entire coffee maker for removal, if desired. Thus, it is possible for the coffee maker to be very quickly and conveniently secured in position on the heating element, or released by simply swinging the single member 24 reversely about its pivot while the coffee maker bowls remain operatively connected. When it is desired for any reason to remove the bail, as for example a new rubber 29 thereon, it will also be evident that one or both of the ends 25 may be readily sprung out of its bearing in the member 20. The latter and the standard 17 also being separable from the bracket 14, it will be evident that the structure is such as to permit compact shipping with the standards removed, while permitting ready assembly when desired. Attention is further directed to the inexpensive character of the structure required to insure the safety of the coffee makers. These and other advantages of my improvements will, however, be clearly apparent to those skilled in the art.

While I have in this application specifically described two forms which my invention may assume in practice, it will be understood that these forms of the same are used for purposes of illustration and that the invention may be modified and embodied in other forms without departing from its spirit or the scope of the appended claims.

What I claim as new and desire to secure by Letters Patent is:

1. In a coffee making device, a base, a vacuum type coffee maker thereon including a lower bowl seated on said base and an operatively connected upper bowl, and means for positioning said coffee maker on said base including a releasable holding member operating on the upper end of said upper bowl.

2. In a coffee making device, a base, a vacuum type coffee maker thereon including an upper bowl, and means for positioning said coffee maker on said base including a swinging bowl engaging vertically movable holding member carried on said base and operating on and engaging said upper bowl.

3. In a coffee making device, a base, a coffee maker comprising operatively connected lower and upper bowls and having said lower bowl seated on said base, and means on said base cooperating with both said bowls and engaging opposite extremities of said coffee maker for positioning and releasing said coffee maker relative to said base while said bowls remain operatively connected.

4. In a coffee making device, a base, a coffee maker comprising operatively connected lower and upper bowls and having said lower bowl seated on said base, and means cooperating with both said bowls for positioning and releasing said coffee maker while said bowls remain operatively connected having a single movable holding and releasing member.

5. In a coffee making device, a base having heating means thereon and a bowl seat above said heating means, a coffee maker comprising operatively connected lower and upper bowls and having said lower bowl seated on said seat over said heating means, and means on said base cooperating with said seat and said upper bowl for positioning and releasing said coffee maker relative to said heating means while said bowls remain operatively connected.

6. In a coffee making device, a base having bowl positioning means, a coffee maker comprising operatively connected lower and upper bowls and having its lower bowl seated on and positioned by said means, and cooperating positioning means cooperating with said upper bowl for positioning said coffee maker on said base and having a releasable bowl holding member movable to release said coffee maker while said bowls remain operatively connected.

7. In a coffee making device, a base, a coffee maker seated thereon and comprising operatively connected lower and upper bowls, and means cooperating with said upper bowl for positioning said coffee maker on said base comprising a stationary standard on said base and a releasable upper bowl holding bail pivotally mounted on said standard and movable about its pivot to release said bowl.

8. In a coffee making device having lower bowl heating means and stationary means for positioning the lower end of a bowl thereon, a vacuum type coffee maker comprising a lower bowl seated on said heating means and having its lower end engaged and positioned by said positioning means and an operatively connected upper bowl, and cooperating positioning means cooperating with said upper bowl in positioning said coffee maker and movable to release the latter while said bowls remain operatively connected.

9. In a coffee making device having lower bowl heating means and means for positioning a bowl thereon, a vacuum type coffee maker comprising a lower bowl seated on said heating means and positioned by said positioning means and an operatively connected upper bowl, and cooperating positioning means cooperating with said upper bowl in positioning said coffee maker, said first and second mentioned positioning means engaging the remote ends of said bowls.

10. In a coffee making device having lower bowl heating means and means for positioning a bowl thereon, a vacuum type coffee maker comprising a lower bowl seated on said heating means and having its lower end engaged and positioned by said positioning means and an operatively connected upper bowl, a stationary standard, and a member pivoted on a transverse axis on said standard and holding the upper end of said upper bowl.

11. In a coffee making device, a base having bowl supporting means thereon, and coffee maker positioning means carried on said base including a releasable bowl holding member engageable with the upper bowl of a vacuum type coffee maker seated on said bowl supporting means while said bowl is in said coffee maker.

12. In a coffee making device, a base having bowl supporting means thereon, and coffee maker positioning means carried on said base including a vertically swinging pivoted bowl holding member disposable in operative holding relation with the upper bowl of a vacuum type coffee maker seated on said bowl supporting means.

13. In a coffee making device, a base having bowl supporting means thereon, and coffee maker positioning means carried on said base including a standard on said bowl supporting means and an upper bowl holding bail pivoted on the upper end of said standard and movable about its pivot into and out of holding position.

14. In a coffee making device, a base having bowl supporting means thereon, coffee maker positioning means carried on said base including a standard on said bowl supporting means, an upper bowl holding member pivoted on the upper end of said standard and movable about its pivot into and out of holding position, and bowl gripping means on said member forming cushioning means and engageable with said standard in inoperative position.

15. In a coffee making device, a base having bowl supporting means thereon, and a support on said base extending substantially to the top of the upper bowl of a vacuum type coffee maker seated on said support, and a swinging upper bowl holding member pivoted on a transverse axis on said support and having means engageable with an upper portion of the upper bowl of such a coffee maker to restrain the same from lateral movement relative to said support.

16. In a coffee making device, a base having bowl supporting means thereon, and a support on said base extending substantially to the top of the upper bowl of a vacuum type coffee maker seated on said support, and a swinging member pivoted on a transverse axis on said support and having means engageable with an upper portion of the upper bowl of such a coffee maker to restrain the same from lateral movement relative to said support, said member having a portion adapted to receive and be disposed around the mouth of said upper bowl.

17. In a coffee making device, a base having bowl supporting means thereon, and a support on said base extending substantially to the top of the upper bowl of a vacuum type coffee maker seated on said support, and a swinging member pivoted on a transverse axis on said support and having means engageable with an upper portion of the upper bowl of such a coffee maker to restrain the same from lateral movement relative to said support, said member comprising a bail having an opening adapted to receive the mouth of said upper bowl.

18. In a coffee making device, a base having bowl supporting means thereon, and a support on said base extending substantially to the top of the upper bowl of a vacuum type coffee maker seated on said support, and a swinging member pivoted on a transverse axis on said support and having means engageable with an upper portion of the upper bowl of such a coffee maker to restrain the same from lateral movement relative to said support, said base having lower bowl positioning means thereon and a rearwardly extending projection below the same, and said support comprising a standard having its lower end carried by said projection.

19. In a coffee making device, a base having bowl supporting means thereon, and coffee maker positioning means carried on said base including a pivoted vertically movable bowl holding bail disposable over the upper end of the upper bowl of a vacuum type coffee maker seated on said bowl supporting means, and bowl gripping and bail cushioning means on said bail.

20. In a coffee making device, a base having lower bowl positioning means thereon, and cooperating coffee maker positioning means including a releasable bowl holding member engageable with the upper bowl of a vacuum type coffee maker seated on said bowl positioning means and movable relative to said upper bowl to release the latter.

21. In a coffee making device, a base having lower bowl positioning means thereon, and cooperating coffee maker positioning means including a releasable bowl holding member engageable with the upper bowl of a vacuum type coffee maker seated on said bowl positioning means, said bowl holding member being pivotally supported above said base and being receivable over the upper end of such an upper bowl.

22. In a coffee making device, a base having lower bowl positioning means thereon, and cooperating coffee maker positioning means including a pivoted vertically movable bowl holding member cooperating with the upper bowl of a vacuum type coffee maker seated on said bowl positioning means, and cushioning means carried on said bowl holding member engageable with said upper bowl when said holding member is moved to cooperate with said bowl.

23. In a coffee making device, a base having lower bowl positioning means thereon, and cooperating coffee maker positioning means including a pivoted bowl holding member engageable with the upper bowl of a vacuum type coffee maker seated on said bowl positioning means, and a standard on said base having said pivoted member pivoted to the upper end thereof, said bowl holding member being supported on the upper end of said upper bowl in operative position and being disposed in depending position below its pivot when inoperative.

FRANK E. WOLCOTT.